United States Patent [19]

Whitcomb et al.

[11] Patent Number: 4,939,865
[45] Date of Patent: Jul. 10, 1990

[54] METHOD AND CONTAINER FOR GROWING TRANSPLANTABLE PLANTS

[76] Inventors: Carl E. Whitcomb, Rte. 5, Box 174, Stillwater, Okla. 74074; Harold D. Stephens, P.O. Box 506, Jenks, Okla. 74037

[21] Appl. No.: 181,720

[22] Filed: Apr. 14, 1988

[51] Int. Cl.⁵ .............................................. A01G 9/10
[52] U.S. Cl. .......................................... 47/77; 47/66; 47/73
[58] Field of Search .................. 47/66, 73, 74, 75, 77, 47/78; 446/112, 115, 116, 125; 220/5 R, 4 B, 4 E, 19

[56] References Cited

U.S. PATENT DOCUMENTS

| | | | |
|---|---|---|---|
| 3,291,437 | 12/1966 | Bouden et al. | 220/5 R |
| 3,951,294 | 4/1976 | Wilson | 220/5 R |
| 4,442,628 | 4/1984 | Whitcomb | 47/66 |
| 4,497,132 | 2/1985 | Whitcomb | 47/66 |
| 4,510,712 | 4/1985 | Whitcomb | 47/66 |
| 4,716,680 | 1/1988 | Whitcomb et al. | 47/73 |

FOREIGN PATENT DOCUMENTS 2045044 2/1983 United Kingdom .

*Primary Examiner*—Robert A. Hafer
*Assistant Examiner*—Lynda M. Cofsky
*Attorney, Agent, or Firm*—Laney, Dougherty, Hessin & Beavers

[57] ABSTRACT

An improved method and a container for growing a transplantable plant are provided. The container is comprised of a set of upwardly extending removably joined side panels. The side panels are bendable and have vertical edge joints adapted so that one or more of the side panels can be bent arcuately and removably joined together to form a generally cylindrical open-topped container of selected size.

16 Claims, 3 Drawing Sheets

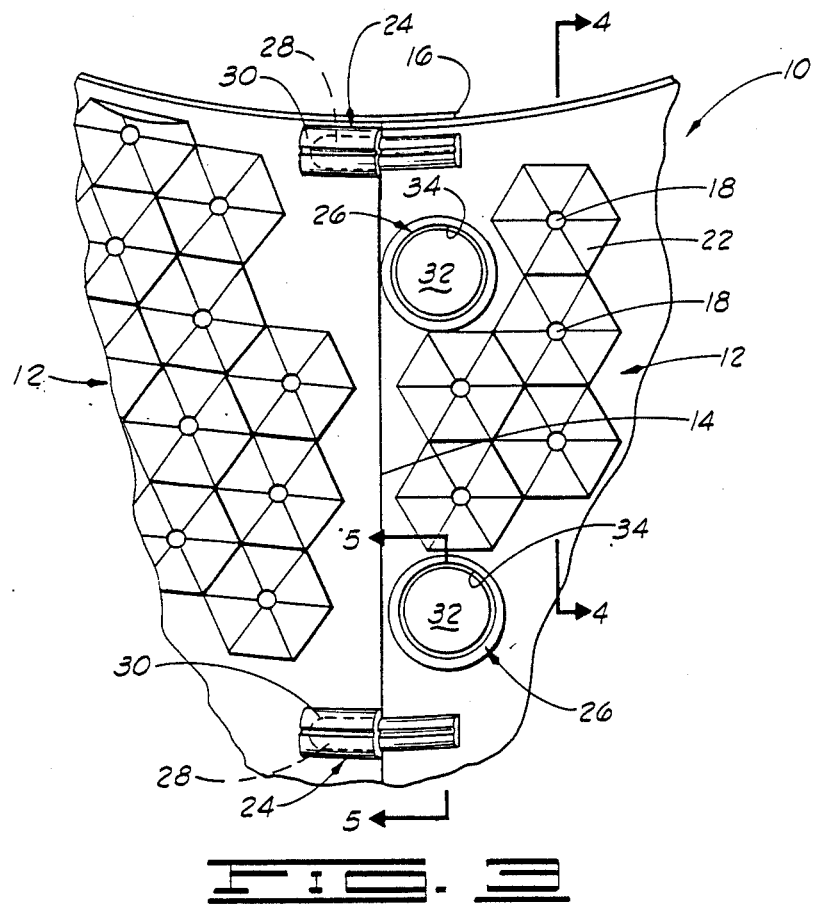
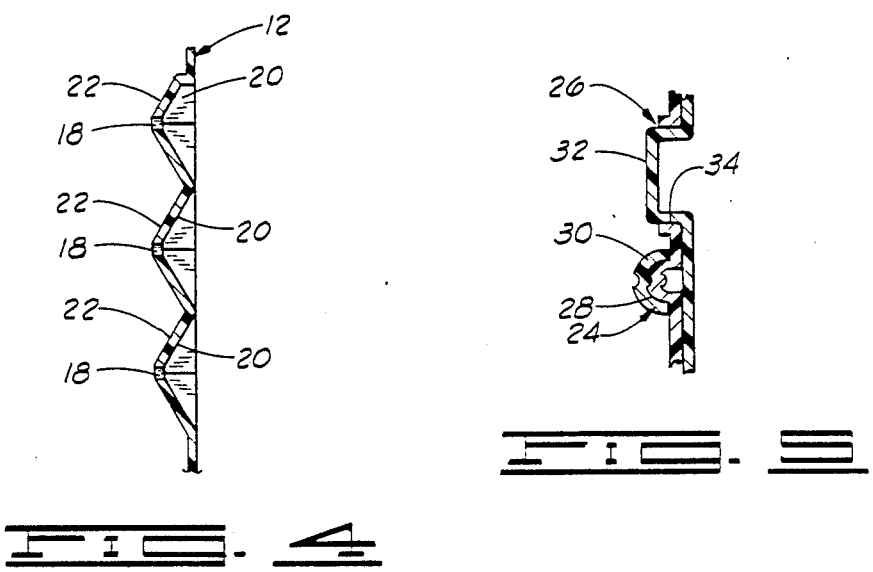

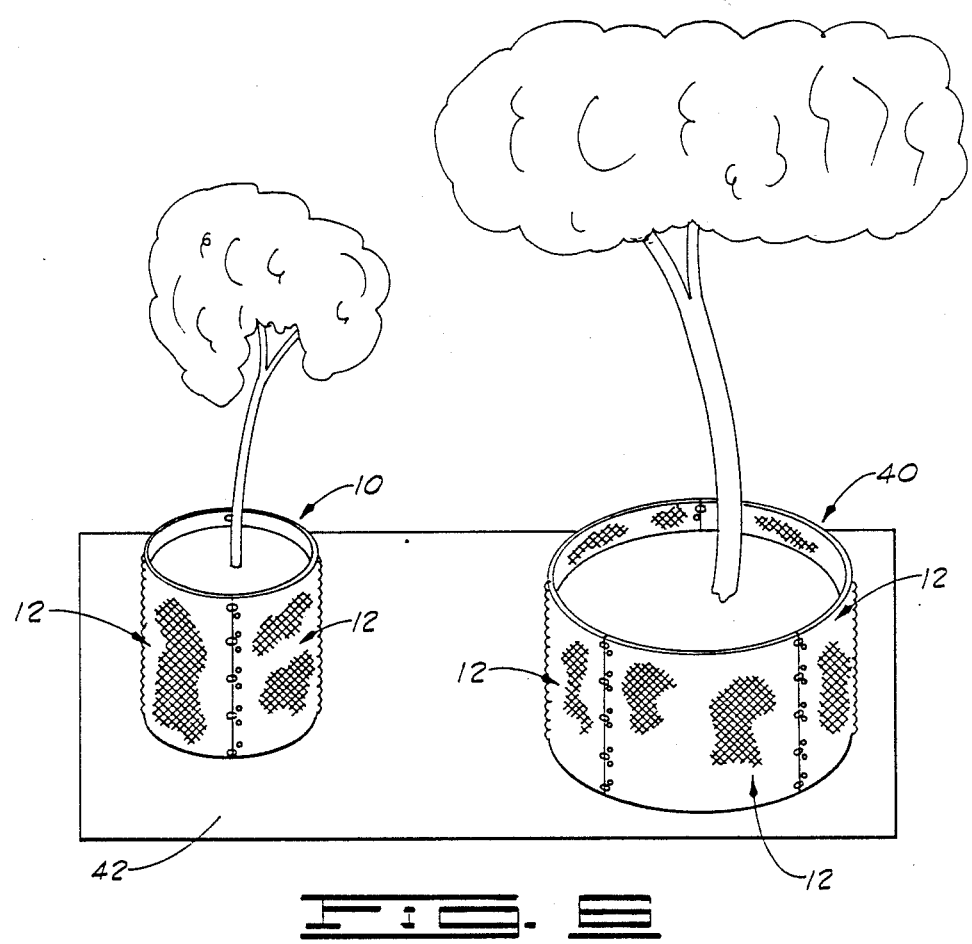
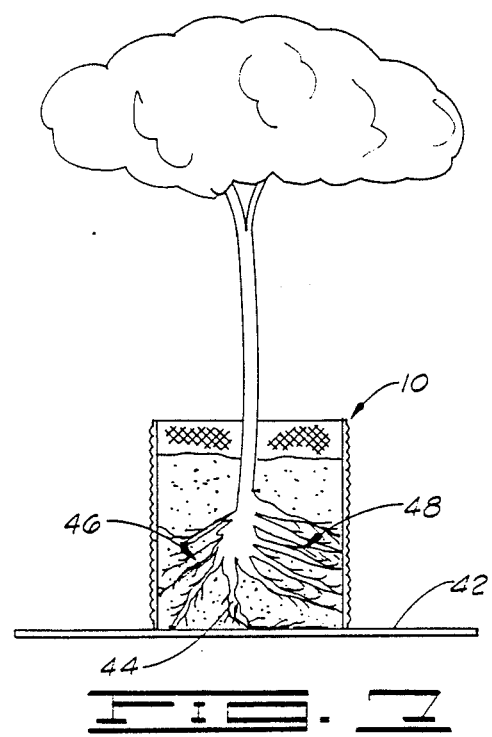

METHOD AND CONTAINER FOR GROWING TRANSPLANTABLE PLANTS

BACKGROUND OF THE INVENTION

1. Field of the Invention

The present invention relates generally to a method and container for growing transplantable plants, and more particularly, to a method and container for growing plants such as trees and shrubs for transplanting.

2. Description of the Prior Art

Plants, such as trees and shrubs, which are intended to be transplanted are commonly grown above ground in containers. Such containerized plants can be grown at a faster rate than those grown in the ground, they are more easily tended, and because the roots of the plants are not severed when the plants are transplanted, transplanting is more often successfully accomplished.

Various types of containers have been used for growing plants, i.e., for retaining the soil and roots of plants prior to transplanting. For example, metal cans and cylindrical plastic containers with holes in the bottoms were among the first plant growing containers used. The problem with such cylindrical containers is that as roots grow outwardly and downwardly within the containers, the sides and bottoms of the containers cause spiral and circular root growth. Spiral and circular root growth is damaging to plants in that such root growth does not provide lateral anchorage for the plants when transplanted, and the spiraled and circled roots do not extend into the soil to gather nutrients.

Cylindrical containers having holes in the sides to terminate spiral and circular root growth have also been utilized. The side holes or openings function to cause air-pruning of the roots, i.e., when a root extends into the vicinity of an opening whereby it is exposed to the atmosphere, the growth of the root stops. While the use of cylindrical containers with side holes reduces the incidence of spiraled and circled roots, some spiraling and circling still take place.

Transplantable landscape plants have also been grown in square, bottomless containers placed on wire screens whereby roots reaching the bottom of the container are air-pruned. Most of the root tips produced end up at the bottom of such containers, and the requirement of placing the containers on wire screen surfaces generally makes the practice uneconomical.

Recently, containers have been developed for controlling spiral and circular root growth whereby the root tips are physically trapped by surfaces in the container and are prevented from elongating, or the spiraling and circling root tips are caused to pass through vertical openings in the sides of the container whereby the tips are air-pruned. Such a root trapping type of container is described in U.S. Pat. No. 4,442,628 issued Apr. 17, 1984. A container including vertical side wall openings for air-pruning spiraling or circling roots is described in U.S. Pat. No. 4,497,132 issued Feb. 5, 1985.

Most recently, containers have been developed (see U.S. Pat. No. 4,716,680 issued Jan. 5, 1988) comprised of removably joined rectangular side panels which form a rectangular open-topped container. The interiors of the side panels include lattices of root trapping recesses having pointed ends for directing roots whereby they become trapped. The trapping of the roots causes the growth at the ends to terminate and lateral root growth to develop. The side panels can be disconnected and moved laterally apart to prevent damage to the root tips trapped in the recesses. While such root trapping containers formed of removably joined side panels can be used successfully, they suffer from the disadvantage that different sizes of side panels are required for different sizes of containers.

By the present invention, an improved method and container for growing a transplantable plant are provided which obviate the various problems mentioned above.

SUMMARY OF THE INVENTION

An open-topped container for growing a plant intended to be transplanted having upwardly extending removably joined side panels is provided. The side panels are bendable and have vertical edge joints adapted so that one or more of the side panels can be bent arcuately and removably joined together to form a generally cylindrical container of a selected size. Each of the side panels preferably includes a plurality of holes therein whereby roots growing within the container are air-pruned when they reach the vicinities of the holes.

In a particularly preferred embodiment, the container of the present invention is comprised of a set of identical side panels, each of which includes a lattice of root trapping outwardly pointed recesses formed in the interior surface thereof. The recesses each terminate in a hole in the side panel whereby roots are directed by the recesses to the holes and air-pruning quickly takes place.

In the method of the invention for growing and transplanting a plant from one growing medium in an open-topped container to another growing medium, a selected number of the side panels formed of bendable material are joined at their vertical edge joints whereby they are bent arcuately to form an open-topped container of generally cylindrical shape and of desired relative size. A growing medium and a plant intended to be transplanted are placed in the container and the plant is grown. When the plant is transplanted, the side panels are disconnected and moved laterally away from the roots to prevent damage thereto.

It is, therefore, a general object of the present invention to provide an improved method and container for growing transplantable plants.

Another object of the present invention is the provision of an improved container for growing a plant intended to be transplanted whereby spiral and circular root growth is prevented, and the development of lateral root tips along and around the sides of the container is maximized.

A further object of the present invention is the provision of an improved container and method of growing a plant for transplantation wherein the container is comprised of a selected number of removably joined side panels resulting in the container having a selected size, which size can be readily changed if required during plant growth.

Yet a further object of the present invention is the provision of an improved container for growing a plant intended to be transplanted which is economical to manufacture and use while providing maximum plant growth and transplantation advantages.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 3 is a partial exploded view of a portion of the container of FIG. 1

FIG. 4 is a cross-sectional view taken along line 4—4 of FIG. 3.

FIG. 5 is a cross-sectional view taken along line 5—5 of FIG. 3.

FIG. 6 is a perspective view of two containers of the present invention having trees growing therein.

FIG. 7 is a side partially cross-sectional view of one of the containers of FIG. 6 showing the root growth therein.

DESCRIPTION OF THE PREFERRED EMBODIMENTS

In the typical growth of a plant in a container, either from a germinating seed or from a transplanted tree or shrub, a tap root is formed which grows at a faster rate than other roots. The tap root quickly reaches the bottom of the container, and changes direction in response to the container while continuing to grow until becoming physically trapped or exiting the container by way of an opening therein and being air-pruned. Once the tap root growth is terminated, the apical dominance of the root tip is lost and the development of secondary lateral roots along the length of the tap root is promoted. The secondary lateral roots generally grow outwardly toward the sides of the container and slightly downwardly. When such roots contact the sides of the container, unless trapped, they turn and grow downwardly in a spiral path to the bottom of the container where they continue to grow in a circular pattern until they are trapped or terminated by air-pruning.

When plants having root growth which is orientated downwardly and concentrated at the bottom of a container as described above are transplanted, little or no lateral anchorage of the plant is provided by the roots, and the tips of the roots are at a depth in the soil where aeration is less favorable. In addition, the downwardly orientated roots are intermingled with each other and as they increase in diameter with age, they exert pressure on one another which can restrict the normal flow of water and nutrients through the roots.

The present invention provides an improved plant growth container and method for growing and transplanting a plant whereby lateral root growth is promoted and the production of lateral root tips which are not damaged by transplantation is maximized. Moreover, an efficient, economical and versatile container and transplantation method are provided. Upon transplantation, root tips are present at all levels in the growth medium, and the root tips quickly grow in all directions whereby the plant is quickly laterally anchored and maximum water and nutrients are absorbed.

Figure 2:
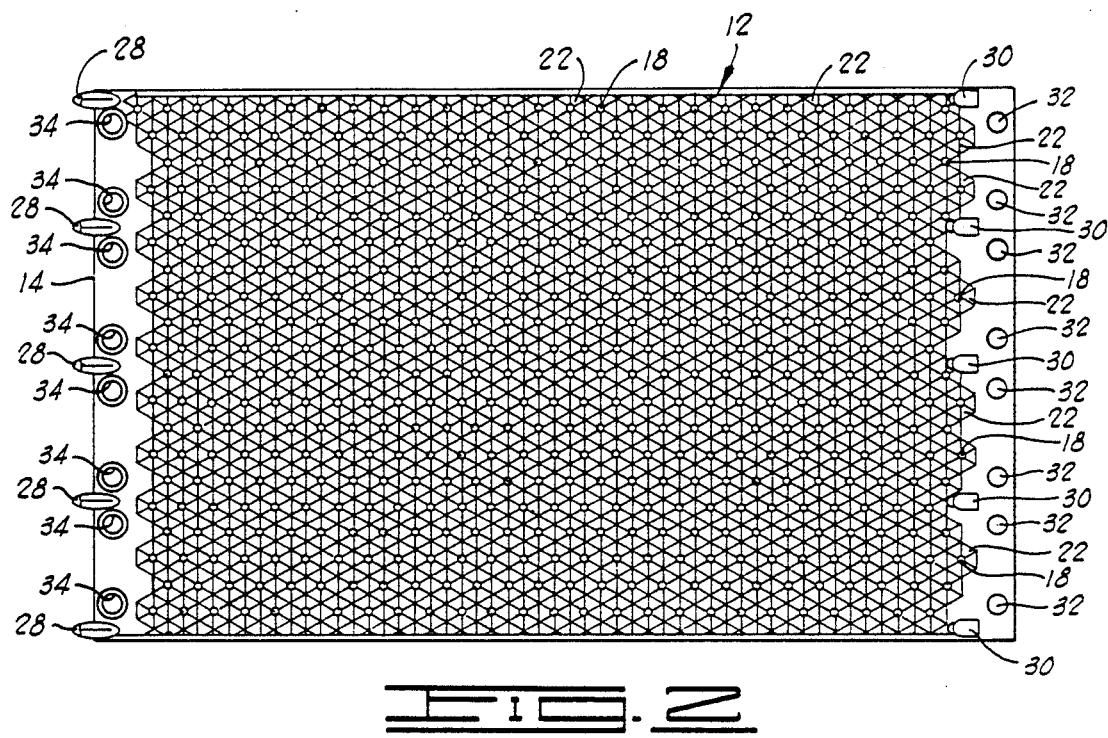
FIG. 2 is a side elevational view of one of the side panels of the container of FIG. 1.
Figure 1:
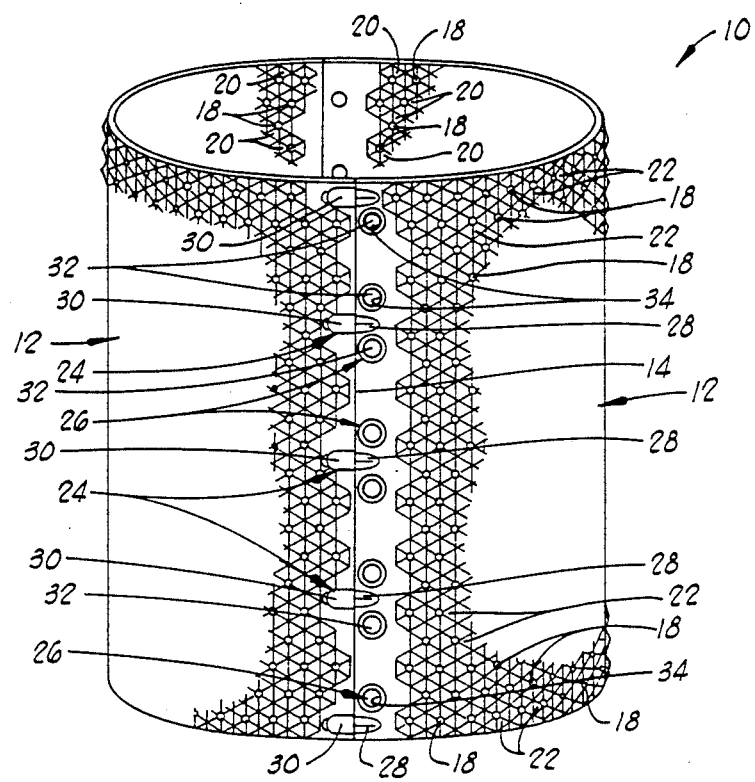
FIG. 1 is a perspective view of a container for growing transplantable plants of the present invention.

Referring now to the drawings, and particularly to FIGS. 1-5, a container for growing transplantable plants of the present invention is illustrated and generally designated by the numeral 10. The container 10 is comprised of a set of identical upwardly extending side panels 12 which are bendable and which are removably joined together at their vertical edges 14 and 16. In FIG. 1, the container 10 is comprised of a pair of side panels 12, but as will be described further hereinbelow, the container 10 can be comprised of a greater number of side panels 12.

The side panels 12 are of generally rectangular shape, and preferably include a plurality of holes 18 for air-pruning root tips therein. Each of the side panels further preferably includes a lattice of root trapping outwardly pointed recesses 20 formed in the interior surface thereof, with each of the recesses 20 terminating in one of the holes 18 whereby roots growing within the container 10 to the side panels 12 are directed by the recesses 20 to the holes 18.

As shown best in FIGS. 3-5, the side panels 12 are preferably formed in relatively thin sheets of bendable material, e.g., a thermoplastic material. The outwardly pointed root trapping recesses 20 formed in the interiors of the side panels 12 produce corresponding outwardly extending protuberant portions 22 on the exteriors of the side panels. As shown best in FIGS. 3 and 4, the recesses 20 (and corresponding protuberant portions 22) are preferably of identical pyramidal shapes. Such shape provides the most rigidity and strength to the side panels 12, and functions efficiently to trap and direct growing roots to the openings 18.

The vertically extending edges 14 and 16 of the side panels 12 are removably joined together by two sets of mortise and tenon joints positioned in spaced relationship thereon, generally designated in FIGS. 1, 3 and 5 by the numerals 24 and 26. The mortise and tenon joints 24, when connected as shown in FIGS. 1, 3 and 5, prevent lateral movement between the side panels 12, and the mortise and tenon joints 26 prevent longitudinal movement therebetween.

The mortise and tenon joints 24 are identical, and such joints are comprised of longitudinally orientated (FIG. 2) or circumferentially orientated (FIG. 1) tenons 28 spaced along the vertical edge 14 of each side panel 12, i.e., the tenons 28 extend generally perpendicularly to the vertical edge 14. Complementary mortises 30 are formed in each side panel 12 adjacent the edge 16 thereof for receiving the tenons 28 in joined engagement therewith.

The mortise and tenon joints 26 are comprised of radially orientated (FIG. 1) outwardly extending cylindrical tenons 32 spaced along and adjacent the vertical edges 14 and 16 of the side panels 12, and corresponding circular mortises 34 spaced along and adjacent the vertical edges 14 thereof. When joined, the tenons 32 extend through the mortises 34 as illustrated in FIGS. 1, 3 and 5.

In removably joining the vertical edge 14 of one side panel 12 to the vertical edge 16 of another side panel 12, the tenons 28 are first fitted into the mortises 30 followed by the fitting of the tenons 32 into the mortises 34. As indicated above, the tenons 28 and mortises 30, i.e., the joints 24, hold the side panels together laterally and the tenons 32 and mortises 34, i.e., the joints 26, hold the side panels together longitudinally. The two side panels, thus joined, are bent arcuately and joined together at their opposite vertical edges 14 and 16 to form a cylindrical container, or one or more additional side panels 12 are joined to the two joined side panels, etc., to form a larger cylindrical container of selected size.

In carrying out the method of the invention, one or more of the side panels 12 are joined at their vertical edges 14 and 16 by means of the mortise and tenon joints 24 and 26 to form a generally cylindrical container having an open top. Referring specifically to FIG. 6, a container 10 is illustrated formed of two side panels 12, and a second container 40 is shown formed of three side panels 12. The particular number of side panels 12 utilized depends on the size of the plant to be grown in the resulting container. As shown in FIG. 6, the containers are placed on a root impervious surface 42 which can be plastic, roofing paper, concrete or other surface, then filled with growing medium and a plant is planted therein. As the plant grows, lateral root growth is maximized by the recesses 20 and holes 18 as described above and as shown in FIG. 7. At the end of the growth period prior to transplantation, root tips are provided at all levels of the growing medium. The plant is then transplanted from the container to a second growing medium by providing a hole in the second growing medium and placing the root portion of the plant therein. Either before or after placing the roots in the hole, the side panels 12 are disconnected from each other by disconnecting the mortise and tenon joints 24 and 26 thereof, moved laterally outwardly apart so as not to damage the root tips and removed. The hole is then filled with additional soil to surround exposed root tips, etc. Once removed, the side panels 12 can be re-used to form another container of desired size.

As will be understood, any desired number of side panels 12 can be utilized to make up a container of selected size. If during the growth of a plant prior to when it is transplanted, it is desirable to increase the size of the container in which the plant is being grown, one or more side panels 12 can be added to the container and additional growing medium placed in the container. For example, if the panels 12 each have lengths of nineteen inches, then each additional side panel 12 added to the container adds six inches to the diameter of the container. A container 10 formed of one nineteen-inch long side panel has a diameter of six inches, and a container formed of two nineteen-inch long side panels 12 has a diameter of twelve inches. A container 40 formed of three such side panels has a diameter of eighteen inches, a container formed of four such side panels has a diameter of twenty-four inches, and so on.

Referring particularly to FIG. 7, it can be seen that a plant which grows within a container of this invention will have a root structure confined by the shape of the container so as to maximize lateral root growth. That is, a tap root 44 grows downwardly, encounters the surface 42 and grows to a side of the container 10 where it is directed by one of the recesses 20 to an opening 18 and air-pruned. The air-pruning of the tap root 44 terminates its growth at its tip and promotes lateral root growth as shown at 46 and 48. The lateral root growth, in turn, encounters the sides of the container 10, and each root is trapped and directed by a recess 20 to the vicinity of a hole 18 whereby it is also air-pruned. Additional lateral root growth results until lateral root tips surround the interior of the container 10. Upon transplantation, root tips are present at all levels in the growth medium which grow in all directions, quickly anchoring the plant and providing rapid absorption of water and nutrients.

While preferred embodiments of the present invention have been described for the purpose of this disclosure, numerous changes in the construction and arrangement of the container parts will suggest themselves to those skilled in the art, which changes are encompassed within the spirit of this invention as defined by the appended claims.

What is claimed is:

1. A plant container, comprising a plurality of identical upwardly extending removably joined substantially planar side panels which are bendable and which have vertical edge joints adapted so that said side panels are bent arcuately in response to being removably joined to form a generally cylindrical open-topped container of selected size for receiving a growing medium and a transplantable plant, wherein each of said side panels includes a plurality of holes and a lattice of root trapping outwardly pointed recesses formed in the interior surface thereof with each of said recesses terminating in one of said holes whereby said roots are directed by said recesses to said holes, and wherein all of said vertical edge joints permit said side panels to be disconnected and removed laterally outwardly from said growing medium.

2. The container of claim 1 wherein each of said recesses is of a generally pyramidal shape.

3. The container of claim 2 wherein each of said side panels is of a generally rectangular shape.

4. A container for growing a plant which is intended to be transplanted, comprising:
   a set of bendable upwardly extending substantially planar side panels of identical size and shape, each having vertical edge joints adapted so that said side panels can be bent arcuately and removably joined together to form a generally cylindrical container having an open top;
   each of said side panels including a plurality of holes therein whereby roots growing within said container are air pruned when they reach the vicinities of said holes; and
   wherein each of said side panels is further characterized to include a lattice of root trapping outwardly pointed recesses formed in the interior surface thereof, each of said recesses terminating in one of said holes whereby said roots are directed by said recesses to said holes.

5. The container of claim 4 wherein each of said recesses is of a generally pyramidal shape.

6. The container of claim 5 wherein each of said side panels is of a generally rectangular shape.

7. The container of claim 6 wherein said edge joints are mortise and tenon joints.

8. The container of claim 7 wherein said set of side panels includes two or more side panels.

9. A method of growing and transplanting a plant from one growing medium in an open-topped container having upwardly extending removably joined side panels to a second growing medium, comprising forming said side panels as substantially planar side panels of bendable material and providing vertical edge joints thereon adapted so that a selected number of said substantially planar side panels can be bent arcuately and removably joined together to form said open-topped container of generally cylindrical shape and desired relative size, wherein said substantially planar side panels further each include a plurality of holes whereby roots growing within said container are air-pruned when they reach the vicinities of said holes.

10. The method of claim 9 wherein each of said side panels is further characterized to include a lattice of root trapping outwardly pointed recesses formed in the interior surface thereof, each of said recesses terminating in one of said holes whereby said roots are directed by said recesses to said holes.

11. The method of claim 10 wherein each of said side panels is identical in size and shape.

12. The method of claim 11 wherein each of said recesses is of a generally pyramidal shape.

13. The method of claim 12 wherein each of said side panels is of a generally rectangular shape and said edge joints are mortise and tenon joints.

14. A bendable side panel for forming a container for a transplantable plant, comprising:
- a substantially planar generally rectangular sheet of bendable material having two parallel vertically extending edges;
- means for removably joining said edges to form a generally cylindrical open-topped container, wherein said joining means can be used to removably join said vertical edges to the vertical edges of at least one other bendable side panel in order to increase the diameter of side open-topped container; and
- a lattice of outwardly pointed recesses formed in the interior surface of said sheet, wherein each of said recesses is of a generally pyramidal shape.

15. The side panel of claim 14 wherein each said pyramidal recess has a hole at the vertex of said pyramidal recess whereby the roots of said transplantable plant are directed by said recesses to said holes.

16. The side panel of claim 15 wherein said joining means comprises a set of mortise and tenon joints.

* * * * *